United States Patent
Mitani

(10) Patent No.: US 7,248,295 B2
(45) Date of Patent: Jul. 24, 2007

(54) IMAGE PICKUP APPARATUS INCLUDING A SOLID-STATE IMAGER HAVING A PLURALITY OF LIGHT RECEPTIVE AREAS

(75) Inventor: Kohji Mitani, Tokyo (JP)

(73) Assignee: Nippon Hoso Kyokai, Tokyo (JP)

(*) Notice: Subject to any disclaimer, the term of this patent is extended or adjusted under 35 U.S.C. 154(b) by 735 days.

(21) Appl. No.: 10/465,545

(22) Filed: Jun. 20, 2003

(65) Prior Publication Data

US 2003/0234881 A1   Dec. 25, 2003

(30) Foreign Application Priority Data

Jun. 24, 2002  (JP) .............................. 2002-183539

(51) Int. Cl.
*H04N 5/217* (2006.01)
*H04N 5/225* (2006.01)
*H04N 3/14* (2006.01)

(52) U.S. Cl. ........................ 348/241; 348/262; 348/323

(58) Field of Classification Search ................ 348/241, 348/294, 296, 297, 312, 323, 367, 262
See application file for complete search history.

(56) References Cited

U.S. PATENT DOCUMENTS

| | | | | |
|---|---|---|---|---|
| 5,969,759 | A | * | 10/1999 | Morimoto ................ 348/311 |
| 6,791,615 | B1 | * | 9/2004 | Shiomi et al. ............. 348/323 |
| 6,829,003 | B2 | * | 12/2004 | Takami ...................... 348/76 |
| 7,027,093 | B2 | * | 4/2006 | Miyahara ................... 348/313 |

OTHER PUBLICATIONS

Y. Morinaka, et al., ITE Technical Report vol. 25, No. 3, pp. 7-11, the Institute of Image Information and Television Engineers, Jan. 2001. Partial Translation.
Kohji Mitani, et al., ITE Winter Annual Convention 2000, 4-1, p. 71, the Institute of Image Information and Television Engineers, 2000. Partial Translation.

* cited by examiner

*Primary Examiner*—Lin Ye
*Assistant Examiner*—Justin Misleh
(74) *Attorney, Agent, or Firm*—Armstrong, Kratz, Quintos, Hanson & Brooks, LLP

(57) ABSTRACT

A solid-state imager 20 outputs image signals corresponding to picture elements received from light-receptive areas thereof. A sample-and-hold circuit 24 performs a sample-and-hold operation for the image signals at prescribed times. A driving circuit 22 generates driving pulses and sample-and-hold pulses. A horizontal charge-transfer circuit of each light-receptive area is driven with the driving pulses, and the sample-and-hold circuit 24 is driven with the sample-and-hold pulses in synchronization with the driving pulses. The driving circuit 22 intermittently drives the horizontal charge-transfer circuit and the sample-and-hold circuit after the output of at least one of the first and last image signals. Consequently, noise that would be produced in picture elements located at the junctures between adjoining light-receptive areas can be reduced, and loss of image quality that would be caused by the effects of operations in subsequent processes performed in various circuits can be reduced.

4 Claims, 6 Drawing Sheets

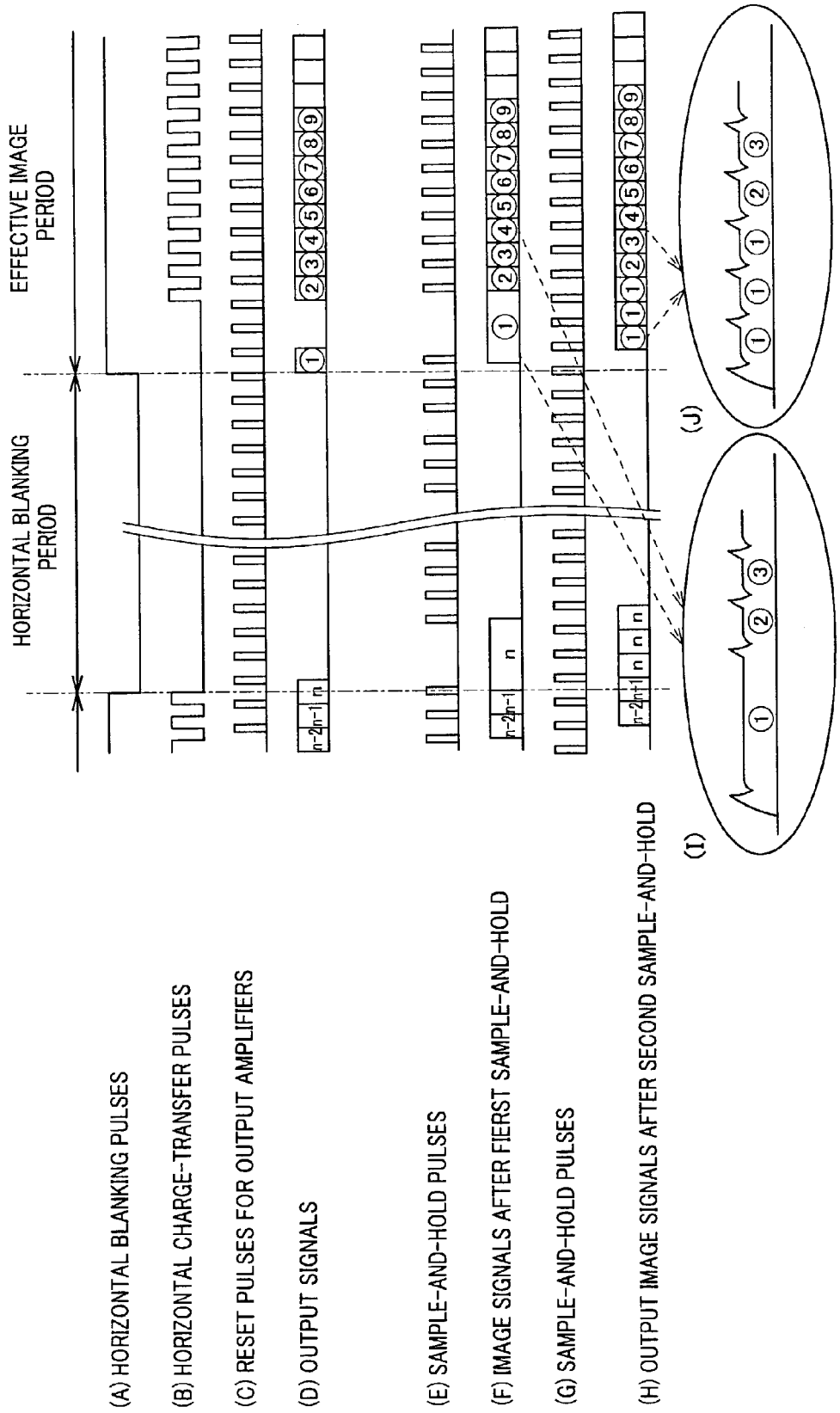

IMAGE PICKUP APPARATUS INCLUDING A SOLID-STATE IMAGER HAVING A PLURALITY OF LIGHT RECEPTIVE AREAS

BACKGROUND OF THE INVENTION

1. Field of the Invention

This invention relates generally to image pickup apparatuses and more particularly to an image pickup apparatus using a solid-state image pickup device (or imager), in which a light-receptive region is divided into a plurality of areas so that an image signal is output from each of the light-receptive areas.

2. Description of the Related Art

FIG. 6A illustrates an example of a structure of a CCD (charge-coupled device) imager. The example of FIG. 6A has a light-receptive region (area) 10 undivided. A signal charge corresponding to each picture element (or pixel) that is transferred vertically (in parallel) from the light-receptive area 10 to horizontal charge-transfer CCDs 12 is then transferred horizontally (serially) through the horizontal charge-transfer CCDs 12 to an output amplifier 14 in which the signal charge is amplified and output from a single image output terminal 16.

The number of horizontal charge-transfer CCDs 12 provided for the imager is several to several tens more than the number of effective picture elements along the horizontal length of the light-receptive area 10, to provide a period for stabilizing the horizontal charge-transfer CCDs 12 and the output amplifier 14 before starting the output of image signals corresponding to effective picture elements. This is because early-stage performance characteristics shown at startup of the horizontal charge-transfer CCDs 12 and the output amplifier 14 that have been at rest during a horizontal blanking period are worse than stable-stage performance characteristics thereof shown during stable operation. In other words, the above arrangement is designed for the purpose of preventing the inferior early-stage performance characteristics from affecting the output of image signals corresponding to the effective picture elements.

FIG. 6B illustrates another example of the structure of the CCD imager. The example of FIG. 6B has a light-receptive region divided into three areas to improve a data rate of output signals of the imager. Signal charges corresponding to picture elements that are transferred vertically from light-receptive areas 10a, 10b and 10c to horizontal charge-transfer CCDs 12a, 12b and 12c, respectively, are then transferred horizontally through the horizontal charge-transfer CCDs 12a, 12b and 12c to output amplifiers 14a, 14b and 14c, respectively, in which the signal charges are amplified and output from three image output terminals 16a, 16b and 16c, respectively.

In the imager as shown in FIG. 6B, the light-receptive areas 10a, 10b and 10c are arranged with no gap left therebetween, and thus it is difficult to provide an extra number of the horizontal charge-transfer CCDs 12a, 12b or 12c so as to make the total number thereof exceed the number of the effective picture elements corresponding thereto. As a result, at startup of the horizontal charge-transfer CCDs 12a, 12b and 12c, the output of image signals from the image output terminals 16a, 16b and 16c starts without preliminary stages. Therefore, the early-stage performance characteristics of the horizontal charge-transfer CCDs 12a, 12b and 12c and the output amplifiers 14a, 14b and 14c would adversely affect the image signals, so that ringing and defects would appear in the image signals output immediately after the beginning of a horizontal effective image period for which the image signals corresponding to the effective picture elements are output.

Further, the output signal of the imager has limitations in band imposed by a low-pass filter and an amplifier circuit in a later step performed in an image signal processing circuit, and thus an adequate signal level of the first picture element could not be obtained immediately after the beginning of the effective image period. Accordingly, when the image signals output from respective areas of the divided light-receptive region are combined to constitute one complete image, vertically-striped noise, which could be generated in picture elements located at the junctures between adjoining light-receptive areas, would disadvantageously make it difficult to produce a seamless image.

To relieve the above problems, it has been proposed that an improved design should be applied to the structure of the imager having a divided light-receptive region (see Morinaka et al., "Development of eight-channel parallel reading CCD", *Technical Report of the Institute of Image Information and Television Engineers*, Vol. 25, No. 3, pp. 7-11, 2002).

Another approach that has been proposed is that ringing or defects that would appear in the image signals output immediately after the beginning of the horizontal effective image period should be corrected in post-processing (see Mitani et al., "Study of Super-High-Definition Color Image Pickup Experimental Equipment", *Winter Convention, 2000, the Institute of Image Information and Television Engineers*, 4-1, p.71).

However, even if the above approaches were adopted, the image signals corresponding to picture elements located at the junctures between adjoining light-receptive areas would be susceptible to detrimental effects of sample-and-hold pulses and other operations in subsequent processes performed in various circuits. These effects would be highly characteristic of nonlinearity, and thus could not be corrected with ease.

The present invention has been made in view of the above-discussed circumstances, and it is one exemplified object of the present invention to provide an image pickup apparatus that can reduce noise that would be produced in picture elements located at the junctures between adjoining light-receptive areas, to obtain image signals adequate to produce a seamless image, and that can reduce loss of image quality that would be caused by the effects of sample-and-hold pulses and other operations in subsequent processes performed in various circuits.

SUMMARY OF THE INVENTION

An image pickup apparatus as one exemplified aspect of the present invention includes: (1) a solid-state imager that includes a plurality of light-receptive areas each having a plurality of picture elements and outputs image signals corresponding to the picture elements from the light-receptive areas; (2) a sample-and-hold circuit that detects at prescribed times instantaneous values of the image signals output from each of the light-receptive areas and continuously outputs each detected value of the image signals until subsequent detection of the image signals is made; and (3) a driving circuit that generates driving pulses and sample-and-hold pulses, wherein a horizontal charge-transfer circuit of each light-receptive area of the solid-state imager is driven with the driving pulses, and the sample-and-hold circuit is driven with the sample-and-hold pulses in synchronization with the driving pulses. The above driving circuit intermittently drives the horizontal charge-transfer circuit and the sample-and-hold circuit after the output of at least one of the image signals corresponding to the picture elements that are output first and last among those from each light-receptive area. Therefore, noise that would be produced in picture elements located at the junctures between adjoining light-receptive areas can be reduced. Moreover, loss of image quality that would be caused by the effects of operations in subsequent processes performed in various circuits can be reduced.

In the above image pickup apparatus, preferably, after the output of at least one of the image signals corresponding to the picture elements that are output first and last among those from each light-receptive area, the driving circuit stops driving the horizontal charge-transfer circuit and the sample-and-hold circuit for a specific period of time at least as long as required for horizontal charge-transfer of one picture element, and starts intermittently driving the horizontal charge-transfer circuit and the sample-and-hold circuit. This arrangement can also serve to reduce noise that would be produced in picture elements located at the junctures between adjoining light-receptive areas, and loss of image quality that would be caused by the effects of operations in subsequent processes performed in various circuits.

The above image pickup apparatuses may preferably be provided with a second sample-and-hold circuit that detects at prescribed regular intervals instantaneous values of the image signals output from the sample-and-hold circuit and continuously outputs each detected value of the image signals until subsequent detection of the image signals is made. The second sample-and-hold circuit serves to reduce loss of image quality derived from the defects that would result from incorporation of sample-and-hold pulses into the image signals.

In the above image pickup apparatuses, sample-and-hold pulses to be supplied to the sample-and-hold circuit and, if applicable, to the second sample-and-hold circuit are preferably generated from pulse signals used in a correlated dual sampling circuit for eliminating noise in the image signals output from the solid-state imager. This contributes to simplified structure of the driving circuit.

Other objects and further features of the present invention will become readily apparent from the following description of preferred embodiments with reference to accompanying drawings.

BRIEF DESCRIPTION OF THE DRAWINGS

FIG. 5 is an operation timing chart of the image pickup apparatus as shown in FIG. 4.

DETAILED DESCRIPTION OF THE PREFERRED EMBODIMENTS

A description will be given of a first embodiment of the image pickup apparatus according to the present invention with reference to FIGS. 1 through 3.

Figure 1:
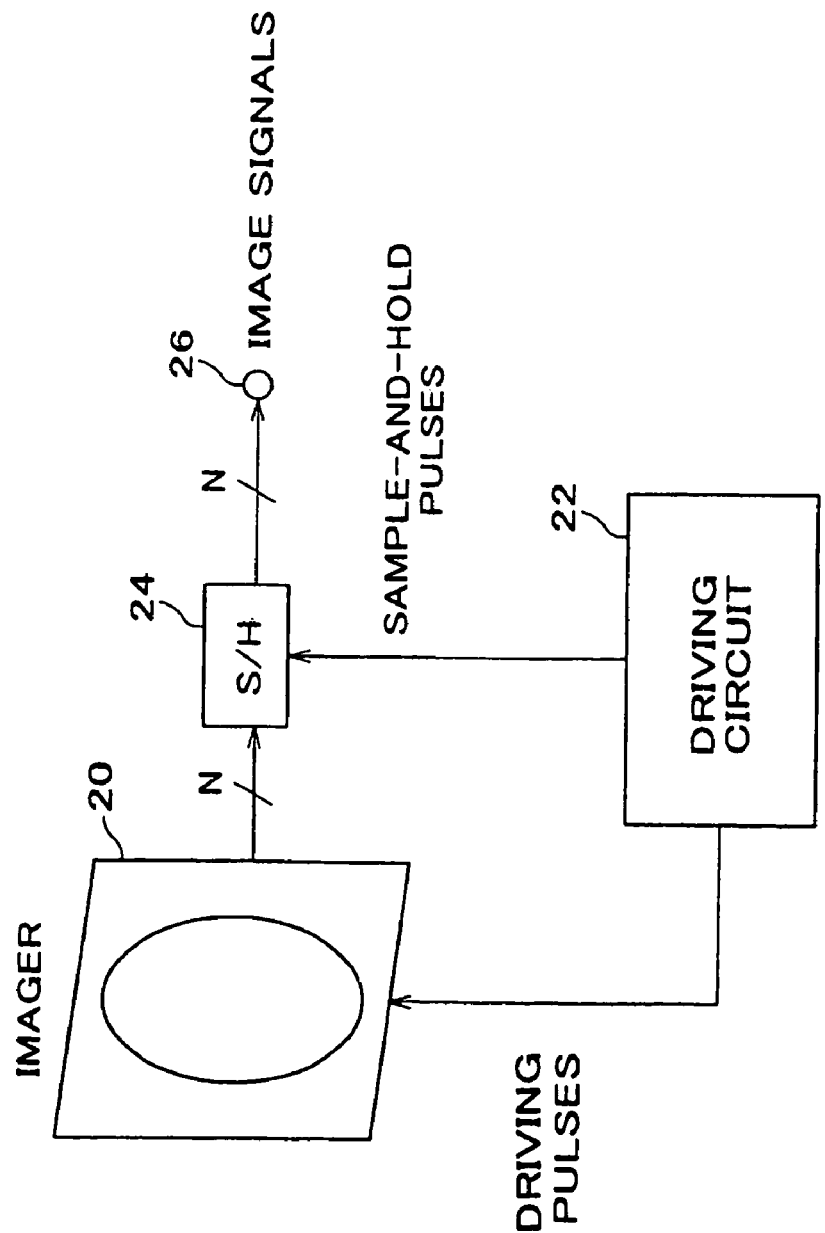
FIG. 1 is a block diagram for illustrating a structure of a first embodiment of an image pickup apparatus according to the present invention.
Figure 6B:
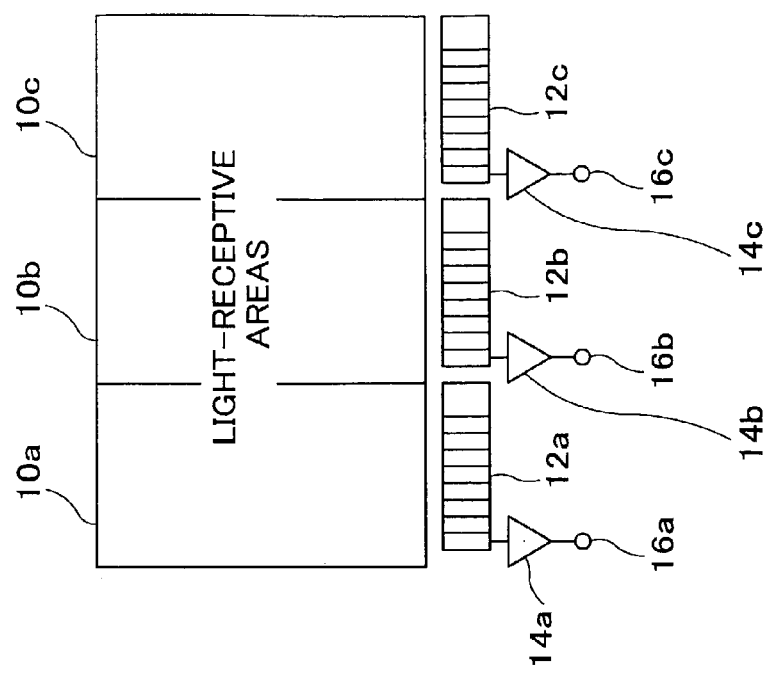
FIG. 6B is a diagram for illustrating another example of the structure of a CCD imager.
Figure 6A:
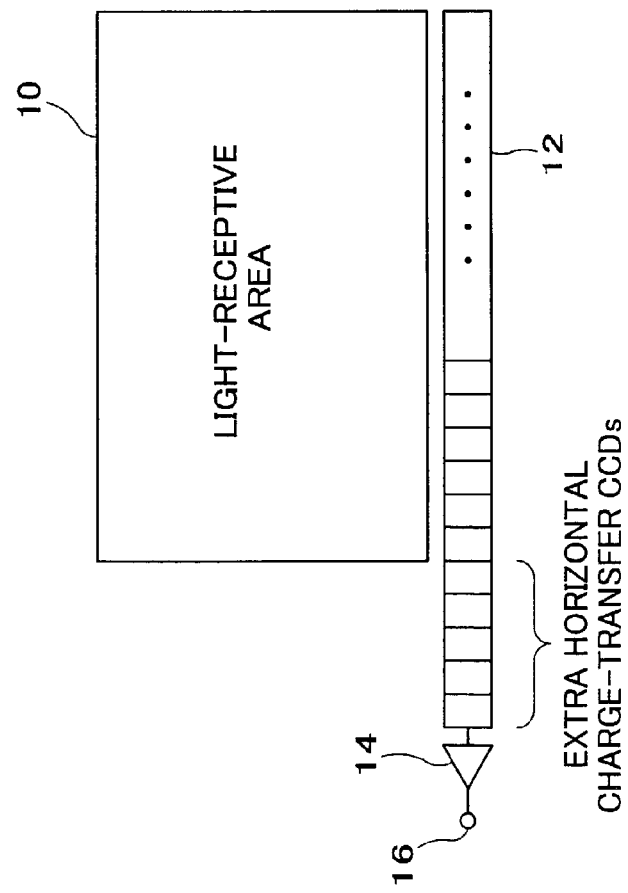
FIG. 6A is a diagram for illustrating one example of a structure of a CCD imager.

Referring to FIG. 1, an imager 20 is the same type of imager as shown in FIG. 6B in which a light-receptive region thereof is divided into a specific number of areas of which the specific number will hereinafter be denoted by N. The imager 20 includes N horizontal charge-transfer CCDs and N output amplifiers. A driving circuit 22 transmits driving pulses to the imager 20 and lets the imager 20 output image signals from the same number N of channels.

The image signals from a specific number N of channels are transmitted to a sample-and-hold circuit (S/H) 24, in which instantaneous values of the image signals are detected at times prescribed by sample-and-hold pulses supplied from the driving circuit 22 and each detected value of the image signals is continuously output until subsequent detection of the image signals is made. The resulting image signals are output through an image output terminal 26.

An operation of the image pickup apparatus as shown in FIG. 1 will now be described with reference to FIGS. 2 and 3, which are timing charts of an exemplary operation of the image pickup apparatus. Normally, a horizontal blanking period for each line of picture elements (along the horizontal length of each light-receptive area), during which horizontal blanking pulses as shown in FIG. 2-(A) exhibit a low level, is a period for which charges are transferred through vertical charge-transfer CCDs for each light-receptive area to the specific number N of horizontal charge-transfer CCDs. Therefore, horizontal charge-transfer pulses as driving pulses exhibit a low level as shown in FIG. 2-(B), and charge-transfer operations of the horizontal charge-transfer CCDs are at a standstill.

Figure 2:
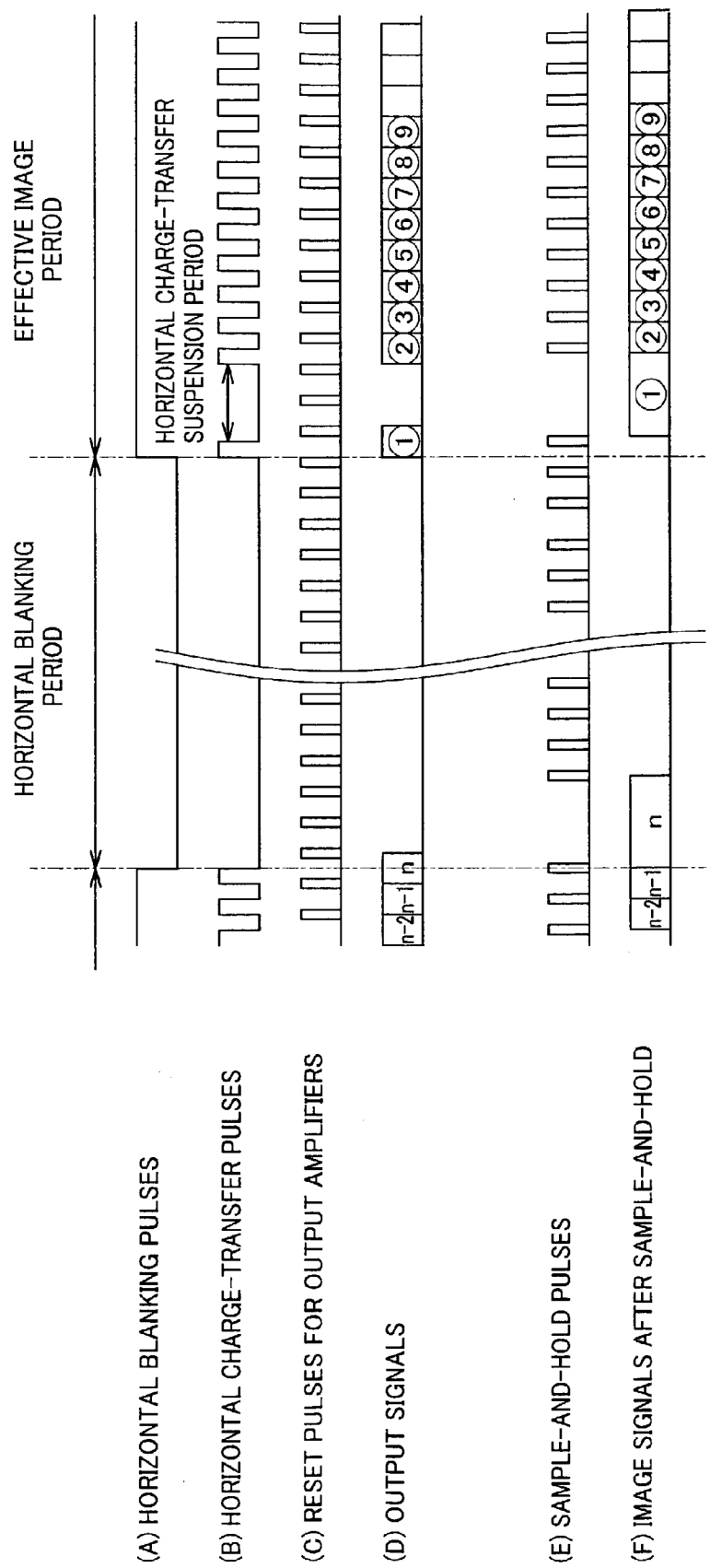
FIGS. 2 and 3 are operation timing charts of the image pickup apparatus as shown in FIG. 1.
Figure 3:
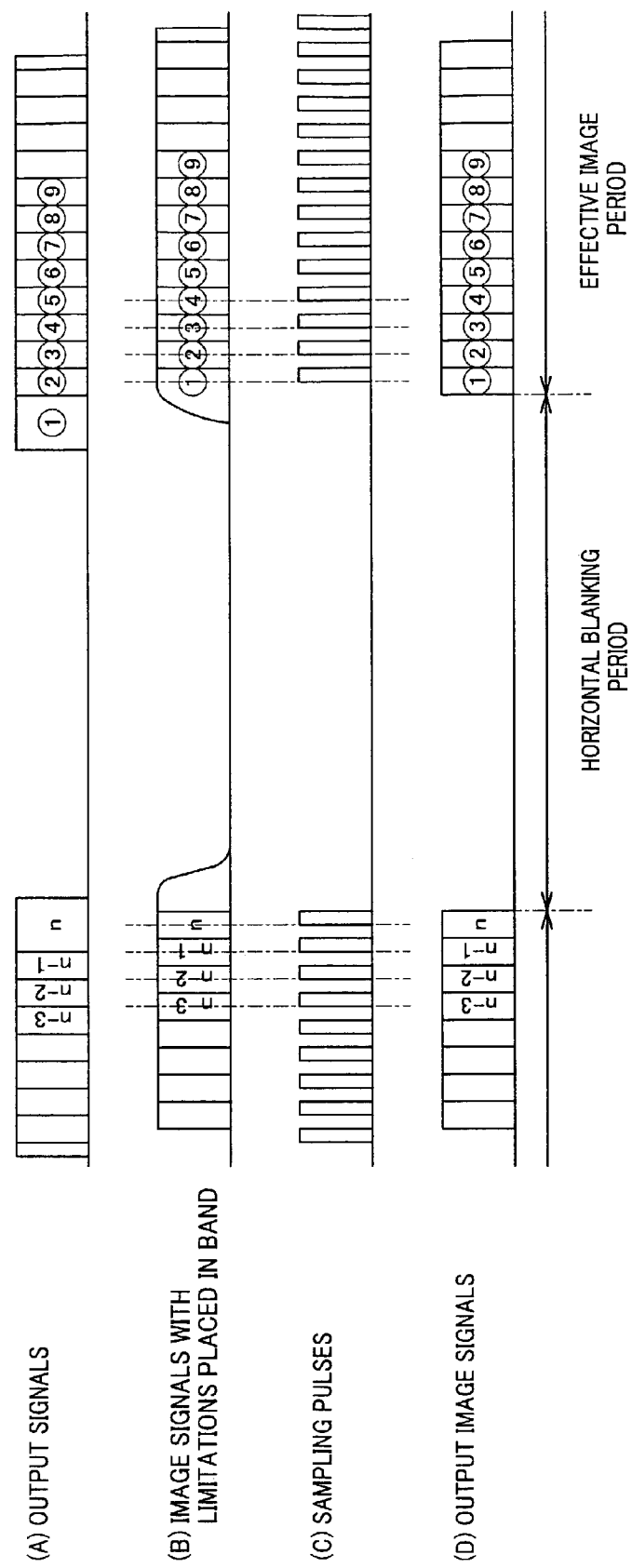

In contrast, during the same horizontal blanking period, regularly spaced reset pulses are applied as shown in FIG. 2-(C) to the output amplifiers provided in the same number N within the imager 20 so that reset operations are continually carried out, because the early-stage performance characteristics of the reset operations would drastically affect the output image signals.

After the beginning of an effective image period for which the image signals corresponding to effective picture elements are transferred, a one-clock horizontal charge-transfer pulse is generated as shown in FIG. 2-(B), and only the first image signal corresponding to the first picture element of each light-receptive area is output as shown in FIG. 2(D). Thereafter, a horizontal charge-transfer suspension period (for the period of two-clock horizontal charge-transfer pulses in FIG. 2-(B)) is provided, before transfer of the image signals is resumed from the second image signal, followed by the third and subsequent image signals in series. It is to be understood that the horizontal charge-transfer suspension period may be set at any period of one or more clock pulses.

The image signals are output from each of the output amplifiers, as shown in FIG. 2-(D), in such a manner as follows: first of all, the first image signal corresponding to the first picture element is output in one picture element period (one-clock period); then, a no-signal period follows which extends for two-clock periods corresponding to the horizontal charge-transfer suspension period; and subsequently, the second, third and other image signals corresponding to the picture elements of each light-receptive area are output in sequence. The image signals output from each channel of the light-receptive area are provided to the sample-and-hold circuit 24.

The sample-and-hold circuit 24 is controlled with sampling pulses (sample-and-hold pulses) synchronized with horizontal charge-transfer pulses that are generated in the driving circuit 22. The sample-and-hold pulses are shaped, as shown in FIG. 2-(E), to detect and hold the first image signal corresponding to the first picture element and to stop for two-clock periods and hold the first image signal until the sample-and-hold circuit 24 receives the second image signal corresponding to the second picture element. Similarly, at the end of the effective image period, when the sample-and-hold circuit 24 detects the last (n-th) image signal corresponding to the n-th picture elements of each light-receptive area, the sample-and-hold circuit 24 holds the last image signal for a specific period (two-clock period).

Consequently, among the image signals corresponding to one line of effective picture elements output from the sample-and-hold circuit 24, only the first and the n-th image signals are two-clock period longer than one picture element period, as shown in FIGS. 2-(F) and 3-(A). If the image signals as shown in FIG. 3-(A) are obtained, limitations in band imposed by an amplifier circuit in a later step or a low-pass filter would only affect the rising characteristics of the first image signal and the falling characteristics of the n-th image signal as shown in FIG. 3-(B). It is apparent that the sample-and-hold operation or analog-to-digital conversion to omit the rising period of the first image signal and the falling period of the n-th image signal makes the output levels of the first image signal and the n-th image signal accurate, as shown in FIG. 3-(D). As a result, when the output signals from the divided light-receptive areas of the imager are combined into one, noise that would be produced in picture elements located at the junctures between adjoining light-receptive areas can be reduced, and image signals adequate to produce a seamless image can be obtained.

Figure 4:
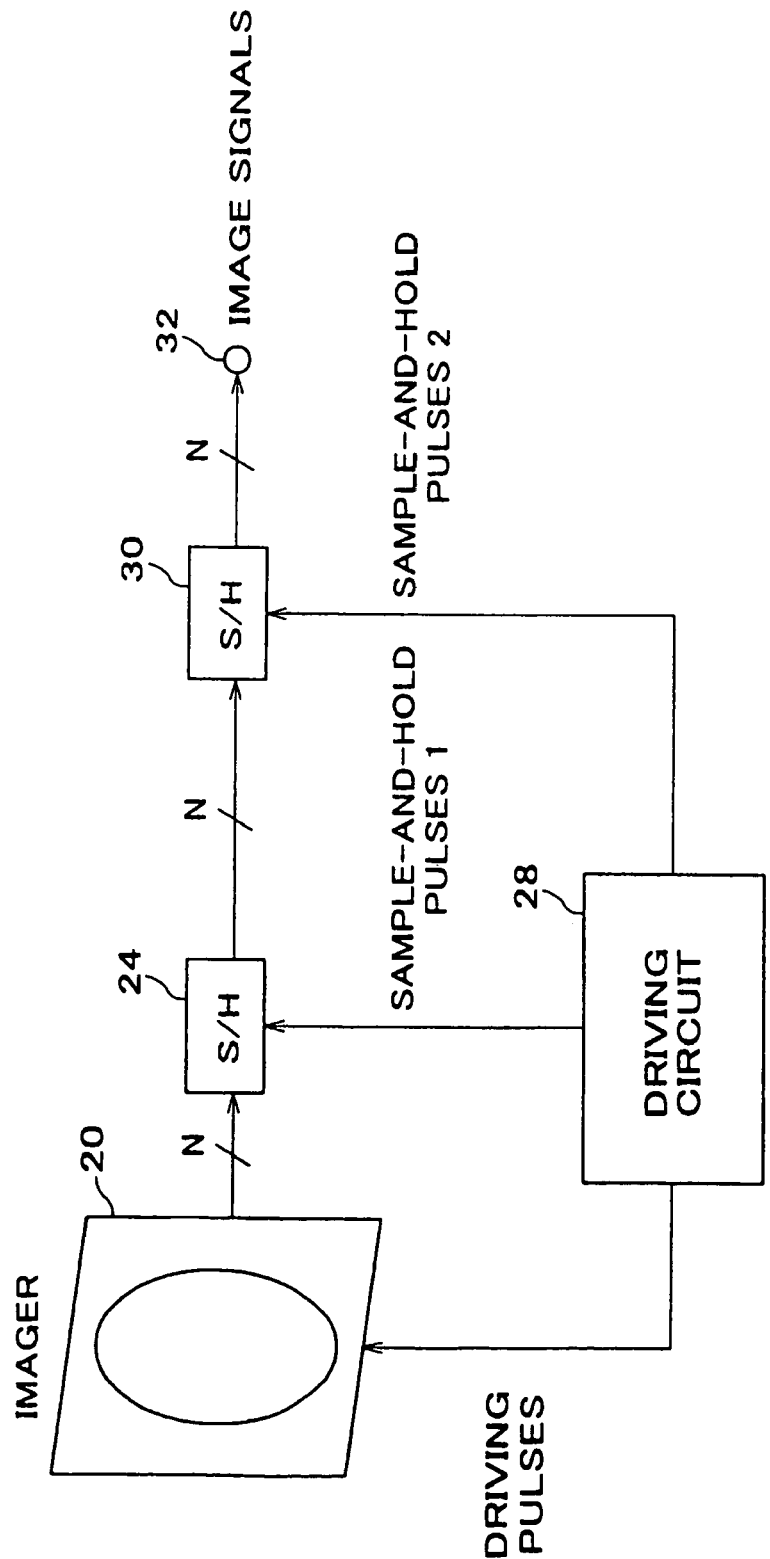
FIG. 4 is a block diagram for illustrating a structure of a second embodiment of the image pickup apparatus according to the present invention

Turning now to FIGS. 4 and 5, a description will be given of a second embodiment of the image pickup apparatus according to the present invention.

A structure of the second embodiment is illustrated in FIG. 4, where those parts corresponding to the components of FIG. 1 are designated by the same reference numerals. In FIG. 4, an imager 20 is the same type of imager as shown in FIG. 6B in which a light-receptive region thereof is divided into a specific number of areas of which the specific number will hereinafter be denoted by N. The imager 20 includes of horizontal charge-transfer CCDs and output amplifiers each in the same number N. A driving circuit 28 transmits driving pulses to the imager 20 and lets the imager 20 output image signals from the same number N of channels.

The image signals from N-channels are transmitted to a sample-and-hold circuit (S/H) 24, in which instantaneous values of the image signals are detected at times prescribed by sample-and-hold pulses supplied from the driving circuit 28 and each detected value of the image signals is continuously output until subsequent detection of the image signals is made. The resulting image signals are in turn transmitted to another sample-and-hold circuit (S/H) 30, in which instantaneous values of the signals are detected at times prescribed by sample-and-hold pulses supplied from the driving circuit 28 and each detected value of the signals is continuously output until subsequent detection of the signals is made, through an image output terminal 32.

An operation of the image pickup apparatus as shown in FIG. 4 will now be described with reference to FIG. 5, which is a timing chart of an exemplary operation of the image pickup apparatus of FIG. 4. The driving circuit 28 generates the same driving pulses and sample-and-hold pulses as the driving circuit 22 does, and let the imager 20 and the sample-and-hold circuit 24 perform the same operations as in the above-described first embodiment.

To be more specific, a horizontal blanking period, during which horizontal blanking pulses exhibit a low level as shown in FIG. 5-(A), is a period for which charges are transferred through vertical charge-transfer CCDs for each light-receptive area to horizontal charge-transfer CCDs of which N is provided in number. Therefore, horizontal charge-transfer pulses as driving pulses exhibit a low level as shown in FIG. 5-(B), and charge-transfer operations of the horizontal charge-transfer CCDs are at a standstill.

In contrast, during the same horizontal blanking period, regularly spaced reset pulses are applied as shown in FIG. 5-(C) to the output amplifiers provided in the same number N within the imager 20 so that reset operations are continually carried out, because the early-stage performance characteristics of the reset operations would drastically affect the output image signals.

After the beginning of an effective image period for which the image signals corresponding to effective picture elements are transferred, one-clock horizontal charge-transfer pulse is generated as shown in FIG. 5-(B), and only the first image signal corresponding to the first picture element of each light-receptive area is output as shown in FIG. 5(D). Thereafter, a horizontal charge-transfer suspension period (for the period of two-clock horizontal charge-transfer pulses in FIG. 5-(B)) is provided, before transfer of the image signals is resumed from the second image signal, followed by the third and subsequent image signals in series. It is to be understood that the horizontal charge-transfer suspension period may be set at any period of one or more clock pulses.

The image signals are output from each of the output amplifiers, as shown in FIG. 5-(D), in such a manner as follows: first of all, the first image signal corresponding to the first picture element is output in one picture element period (one-clock period); then, a no-signal period follows which extends for two-clock periods corresponding to the horizontal charge-transfer suspension period; and subsequently, the second, third and other image signals corresponding to the picture elements of each light-receptive area are output in sequence. The image signals output from each channel of the light-receptive area are provided to the sample-and-hold circuit 24.

The sample-and-hold circuit 24 is controlled with sampling pulses (sample-and-hold pulses) synchronized with device driving pulses that are generated in the driving circuit 28. The sample-and-hold pulses are shaped, as shown in FIG. 5-(E), to detect and hold the first image signal corresponding to the first picture element and to stop for two-clock periods and hold the first image signal until the sample-and-hold circuit 24 receives the second image signal corresponding to the second picture element. Similarly, at the end of the effective image period, when the sample-and-hold circuit 24 detects the last (n-th) image signal corresponding to the n-th picture elements of each light-receptive area, the sample-and-hold circuit 24 holds the last image signal for a specific period (two-clock period).

Consequently, among the image signals corresponding to one line of effective picture elements output from the sample-and-hold circuit 24, only the first and the n-th image signals are two-clock period longer than one picture element period, as shown in FIG. 5-(F).

In the image signals output from the sample-and-hold circuit 24, defects may appear as shown in FIG. 5-(I), which is a magnified view of the image signals, as a result of incorporation of sample-and-hold pulses into the image signals. If the defects appear at unequal frequencies, i.e., with frequency varied according to image signals corresponding to picture elements, defective components of the image signal is likely to constitute noise components, which would disadvantageously lead to degradation of image quality. Particularly, in a high-sensitivity image pickup apparatus, an amplifier circuit with an increased amplification factor is provided downstream, and thus the degradation of image quality derived from the defects as described above would become nonnegligible.

Therefore, in the present embodiment, an additional (second) sample-and-hold circuit 30 is provided, in which the signals output from the sample-and-hold circuit 24 are subjected to another sample-and-hold operation with regularly-spaced sample-and-hold pulses. The sample-and-hold pulses for use in the second sample-and-hold circuit 30 may for example show a 180° phase shift with respect to the sample-and-hold pulses for use in the sample-and-hold circuit 24. Accordingly, the image signals output from the second sample-and-hold circuit 30, as shown in FIG. 5-(H) and magnified in FIG. 5-(J), exhibit regular occurrence of equalized pulses irrespective of incorporated sample-and-hold pulses, so that loss of image quality associated with incorporation of the sample-and-hold pulses can be reduced.

Pulse signals for use in a correlated dual sampling (CDS) circuit that is provided downstream to eliminate noise in the image signals output from the solid-state imager may be supplied to the driving circuits 22 and 28, in which sample-and-hold pulses to be supplied to the sample-and-hold circuits 24 and 30 are generated based upon the pulse signals. This arrangement contributes to a simplified structure of the driving circuits 22 and 28.

Although the preferred embodiments of the present invention have been described above, various modifications and changes may be made in the present invention without departing from the spirit and scope thereof.

According to the present invention, the driving circuit intermittently drives the horizontal charge-transfer circuit and the sample-and-hold circuit after the output of at least one of the image signals corresponding to the picture elements that are output first and last among those from each light-receptive area; thus, noise that would be produced in picture elements located at the junctures between adjoining light-receptive areas can be reduced, and loss of image quality that would be caused by the effects of operations in subsequent processes performed in various circuits can be reduced.

Moreover, after the output of at least one of the image signals corresponding to the picture elements that are output first and last among those from each light-receptive area, the driving circuit stops driving the horizontal charge-transfer circuit and the sample-and-hold circuit for a specific period of time at least as long as required for horizontal charge-transfer of one picture element, and starts intermittently driving the horizontal charge-transfer circuit and the sample-and-hold circuit. This arrangement can also serve to reduce noise that would be produced in picture elements located at the junctures between adjoining light-receptive areas, and loss of image quality that would be caused by the effects of operations in subsequent processes performed in various circuits.

A second sample-and-hold circuit may be provided which provides the image signals output from the sample-and-hold circuit with another sample-and-hold operation in which instantaneous values of the image signals output from the sample-and-hold circuit are detected at prescribed regular intervals and the detected values of the image signals to be output remain constant at a value corresponding to most recent detection until subsequent detection of the image signals is made. The second sample-and-hold circuit serves to reduce loss of image quality derived from the defects that would result from incorporation of sample-and-hold pulses into the image signals.

Further, sample-and-hold pulses to be supplied to the sample-and-hold circuit and, if applicable, to the second sample-and-hold circuit are preferably generated from pulse signals used in a correlated dual sampling circuit for eliminating noise in the image signals output from the solid-state imager. This contributes to simplified structure of the driving circuit.

What is claimed is:

1. An image pickup apparatus comprising:
    a solid-state imager that includes a plurality of light-receptive areas each having a plurality of picture elements and outputs image signals corresponding to the picture elements from the light-receptive areas;
    a sample-and-hold circuit that detects at prescribed times instantaneous values of the image signals output from each of the light-receptive areas and continuously outputs each detected value of the image signals until subsequent detection of the image signals is made; and
    a driving circuit that generates driving pulses and sample-and-hold pulses,
    wherein a horizontal charge-transfer circuit of each light-receptive area of the solid-state imager is driven with the driving pulses, and the sample-and-hold circuit is driven with the sample-and-hold pulses in synchronization with the driving pulses, and
    wherein after the output of at least one of the image signals corresponding to the picture elements that are output first and last among those from each light-receptive area, the driving circuit stops driving the horizontal charge-transfer circuit and the sample-and-hold circuit for a specific period of time at least as long as required for horizontal charge-transfer of one picture element, and starts driving the horizontal charge-transfer circuit and the sample-and-hold circuit, such that the value of the at least one of the image signals corresponding to the picture elements that are output first and last are held for the specific period of time more than twice as long as those of image signals other than the at least one of the image signals.

2. An image pickup apparatus according to claim 1, further comprising:
    a second sample-and-hold circuit that detects at prescribed regular intervals instantaneous values of the image signals output from the sample-and-hold circuit and continuously outputs each detected value of the image signals until subsequent detection of the image signals is made.

3. An image pickup apparatus according to claim 2, wherein sample-and-hold pulses to be supplied to the sample-and-hold circuit and the second sample-and-hold circuit are generated from pulse signals used in a correlated dual sampling circuit for eliminating noise in the image signals output from the solid-state imager.

4. An image pickup apparatus according to claim 1, wherein sample-and-hold pulses to be supplied to the sample-and-hold circuit are generated from pulse signals used in a correlated dual sampling circuit for eliminating noise in the image signals output from the solid-state imager.

* * * * *